United States Patent [19]

Furuta et al.

[11] Patent Number: 5,369,066
[45] Date of Patent: Nov. 29, 1994

[54] REFRACTORY MATERIAL AND PRODUCT THEREOF CONTAINING LOW-SILICA ELECTROFUSED MAGNESIA CLINKER

[75] Inventors: Naoki Furuta; Masakazu Ootsubo; Setsunori Hamaguchi; Isao Watanabe; Yoichi Furuta; Toshihiro Suruga, all of Kitakyushu, Japan

[73] Assignee: Krosaki Corporation, Fukuoka, Japan

[21] Appl. No.: 39,330

[22] PCT Filed: Sep. 18, 1992

[86] PCT No.: PCT/JP92/01189

§ 371 Date: Apr. 26, 1993

§ 102(e) Date: Apr. 26, 1993

[87] PCT Pub. No.: WO93/06057

PCT Pub. Date: Apr. 1, 1993

[30] Foreign Application Priority Data

Sep. 18, 1991 [JP] Japan .................. 3-238313
Nov. 22, 1991 [JP] Japan .................. 3-308055
Jan. 8, 1992 [JP] Japan .................. 4-001782

[51] Int. Cl.⁵ .................................. C04B 35/04
[52] U.S. Cl. ......................... 501/108; 501/122; 106/801
[58] Field of Search ............... 501/108, 122; 106/801

[56] References Cited

U.S. PATENT DOCUMENTS

3,770,467 11/1973 Spencer ................. 501/122
3,808,014 4/1974 Spencer et al. ......... 501/108
4,585,743 4/1986 Yamamoto et al. ....... 501/122

FOREIGN PATENT DOCUMENTS

50-96606 7/1975 Japan .
54-8206 4/1979 Japan .
61-111961 5/1986 Japan .
63-132557 6/1986 Japan .
61-232264 10/1986 Japan .
1103936 4/1989 Japan .

Primary Examiner—Mark L. Bell
Assistant Examiner—Deborah Jones
Attorney, Agent, or Firm—Jordan and Hamburg

[57] ABSTRACT

Disclosed herein are a refractory material of high-purity electrofused magnesia clinker having good resistance to corrosion by slag, especially the slag with a high iron content, at high temperatures under an oxidative environment, and a burned or unburned refractory brick made of such refractory material of high corrosion resistance, which is superior in corrosion resistance as well as spalling resistance.

The refractory material comprises more than 10 wt. % of electrofused magnesia clinker containing 98.0 to 99.8 wt. % of MgO, less than 0.05 wt. % of $SiO_2$, and 0.1 to 2.0 wt. % of CaO. It may be in the form of burned or unburned or prepared unshaped refractories.

14 Claims, No Drawings

REFRACTORY MATERIAL AND PRODUCT THEREOF CONTAINING LOW-SILICA ELECTROFUSED MAGNESIA CLINKER

FIELD OF ART

The present invention relates to a refractory material of magnesia clinker and to an application thereof.

BACKGROUND OF THE INVENTION

Magnesia-carbon bricks composed mainly of MgO have been in general use as a lining material for converters and stainless steel manufacturing furnaces on account of their good spalling and slag resistance.

They are still subject to slag attack when used in an environment where the refining temperature is higher and secondary combustion prevails. This results in the dissolution of the magnesia clinker in slag, leaving the carbon, such as graphite, in bricks always exposed with the surfaces of the bricks. This accelerates the carbon oxidation and, hence, the rate of corrosion.

A conventional way to protect graphite in magnesia-carbon bricks from oxidation is the addition of an antioxidant of a readily oxidizable metal to the brick constituents.

However, an additional antioxidant alone is not enough to prevent the dissolution and oxidation of decarburization layer resulting from a slag attack in refining furnaces operating at 1700° C. or above.

Concerning the improvement of slag corrosion resistance at high temperatures, Japanese Patent Publication No. Sho 54-8206 discloses that electrofused magnesia is superior to sintered magnesia in resistance to corrosion by molten metal and slag when used as a raw material in refractories for steel and non-ferrous metal melting furnaces, because of its power crystal boundaries where mechanical destruction and chemical corrosion begin.

As a raw material of filler for lining refractories for steel and nonferrous metal melting furnaces, electrofused magnesia is used in the form of a grain having a size of 5 to 3 mm, 3 to 1 mm, or 1 to 0 mm, obtained by crushing clinker ingots, which are subjected to classification and particle size regulation.

For electrofused clinker to be a strong filler for refractories, the electrofused magnesia should include a high ratio of single crystal. Clinker ingot with a large ratio of single crystal can be obtained by melting from high-purity magnesia containing more than 99.9 wt. % of MgO. However, this kind of high-purity magnesia is too expensive to be used as a refractory material, so its use is limited to optical windows and electronic device substrates.

A possible means to obtain electrofused magnesia with a high ratio of single crystal is by the electrofusion of a relatively less pure raw material containing 99.0 to 99.8 wt. % of magnesia to obtain clinker ingots from which large crystals are selectively chosen. However, this method is deemed impractical because of low yields.

Meanwhile, it is known that electrofused magnesia used as a filler of refractories exhibits good corrosion resistance because CaO crystallizes out at the grain boundary of the periclase crystal having a high CaO/SiO$_2$ ratio and reacts with slag to increase its viscosity, thereby preventing its infiltration into the grain boundary.

However, electrofused magnesia with a high CaO/SiO$_2$ ratio has the disadvantage of limiting the growth of single crystal by increased impurities. Moreover, the addition of CaO to electrofused magnesia poses a problem associated with the slaking of CaO which deteriorates the structure of refractories.

It is an object of the present invention to provide electrofused magnesia clinker having a high ratio of single crystal which is obtained from a raw material of comparatively low purity which has never before been thought to be usable as well as a refractory material of electrofused magnesia having a high CaO/SiO$_2$ ratio.

It is another object of the present invention to provide a refractory material containing electrofused magnesia clinker which is stable against slag attack and especially has high corrosion resistance against slag with a high iron content, even in an oxidative environment at high temperatures.

It is yet another object of the present invention to provide a refractory material of electrofused magnesia clinker which poses no problems associated with the slaking of CaO when the electrofused magnesia material contains CaO for improving corrosion resistance through the ability of CaO to prevent the infiltration of slag into the grain boundary.

It is a further object of the present invention to provide a burned or unburned refractory brick or a prepared unshaped refractory of good Corrosion and spalling resistance which is produced from highly corrosion-resistant electrofused magnesia clinker.

DISCLOSURE OF THE INVENTION

In general, magnesia clinker in magnesia-carbon bricks begins to deteriorate upon deterioration at the grain boundary. Namely, a foreign matter infiltrates inside of the brick by infiltration of silicate or silicate containing iron oxide into the grain boundary, which accelerates the following reaction to magnesia to form a low-melting material, leading to the disintegration of bricks.

$$2MgO + SiO_2 \rightarrow 2MgO \cdot 2SiO_2$$

$$MgO + FeO \rightarrow (Mg, Fe)O$$

It was found that impurities hinder the growth of periclase crystals generating as the temperature of molten magnesia goes down in the production of electrofused magnesia clinker. Particularly, MgO is the most important factor to inhibit the crystal growth. This finding led to the idea of using magnesia clinker having a higher ratio of single crystal than ordinary magnesia clinker produced from high-purity magnesia. Using magnesia clinker having a higher ratio of single crystal prevents the deterioration at the grain boundaries and the formation of low-melting materials which cause the disintegration of bricks.

The present invention is embodied in a refractory material of electrofused magnesia clinker containing 98.0 to 9.8 wt. % of MgO, less than 0.05 wt. %, preferably less than 0.02 wt. %, more preferably less than 0.01 wt. % of SiO$_2$, and 0.1 to 2.0 wt. % of CaO, with the CaO/SiO$_2$ ratio being high, and also having a markedly high ratio of single crystal in grains of ordinary size for refractory use.

According to the present invention, this electrofused magnesia clinker can be made into burned or unburned refractory bricks with good corrosion resistance upon incorporation with more than 10 wt. % of other refractory materials.

$SiO_2$ contained with CaO in the electrofused magnesia material forms $CaO$-$SiO_2$ compounds in the early stages of the production of electrofused magnesia material, reducing the effectiveness of the free CaO which should prevent the infiltration of slag into the crystal grain boundary.

Moreover, the presence of CaO in an electrofused magnesia material cannot exhibit the effective function in periclase crystals. In other words, CaO effectively operates when reacting with slag which is infiltrating into the grain boundary. Therefore, the presence of CaO should be concentrated into the crystal grain boundary.

In order to concentrate CaO into the crystal grain boundary, when periclase crystals crystalize from molten magnesia for producing an electrofused magnesia material, the periclase crystals should be purified driving CaO, as impurities, toward the crystal grain boundary.

The inventors of the present invention found that the presence of $SiO_2$ is the most important factor to prevent the pure growth of periclase crystals. In the present invention, reduction of the $SiO_2$ content provides the refractory materials in which CaO can be concentrated into the crystal grain boundary, and further provides a burned or unburned refractory brick as well as unshaped refractory for pouring or stamp use.

In addition thereto, according to the present invention, the low $SiO_2$ content promotes the pure growth of periclase crystals, giving rise to electrofused magnesia ingots having a much larger crystal size than ordinary ones of the same magnesia content.

The high ratio of single crystal means the presence of fewer grain boundaries where mechanical disruption and chemical corrosion take place. This leads to improved corrosion resistance against slag and molten metal. In addition, the high $CaO/SiO_2$ ratio drives CaO out of the periclase crystals to the grain boundary of the polycrystalline electrofused magnesia filler. The CaO on the grain boundary reacts with slag, increasing its viscosity, to prevent its infiltration into the crystals. This also leads to improved corrosion resistance.

According to the present invention, the electrofused magnesia should contain 98.0 to 99.8 wt. % of MgO. With an MgO content below 98.0 wt. %, the electrofused magnesia will relatively contain too many impurities to allow the smooth growth of periclase crystals from molten magnesia. Hence the resulting electrofused magnesia lacks its fundamental characteristic properties owing to insufficient crystal size. With an MgO content more than 99.8 wt. %, the electrofused magnesia will not contain a sufficient amount of CaO.

According to the present invention, the electrofused magnesia should contain less than 0.05 wt. % of $SiO_2$. Otherwise, the excess $SiO_2$ will react with CaO to form $CaOSiO_2$ compounds in the early stages of the production of electrofused magnesia. This reaction decreases the amount of free CaO to be driven to the grain boundary where it will prevent the infiltration of slag. Therefore, the $SiO_2$ content should be as low as possible, preferably, lower than 0.03 wt. %, more preferably lower than 0.02 wt. %.

According to the present invention, the electrofused magnesia should contain 0.1 to 2.0 wt. % of CaO. CaO in an amount below 0.1 wt. % will not be enough to prevent the infiltration of slag into the grain boundary through its reaction with slag which causes slag to increase in viscosity. In addition, such a small amount of CaO is insufficient to form MgO.CaO which exists as a solid solution in the low temperature range from room temperature to 700° C., and CaO phase is crystalized in periclase structure, leading to poor resistance of the grain itself against thermal shocks. The desirable CaO content is from 0.2 wt. % to 1.0 wt. %. With a CaO content in excess of 2.0 wt. %, the electrofused magnesia will have poor corrosion resistance because CaO functions as an undesirable impurity. In addition, excess CaO hinders the growth of periclase crystals during the production of clinker. An adequate amount of CaO in the specified range does not pose any problems associated with slaking.

According to the present invention, the electrofused magnesia may be incorporated with a variety of refractory materials, including carbonaceous powder such as natural or artificial graphite, coke, mesophase carbon, carbon black, and diamond powder, ordinary magnesia clinker, electrofused maglime clinker containing 1.5 to 40 wt. % of CaO, other sintered clinker, dolomite clinker filler, and a refractory material selected from zirconia, zircon, alumina, silica, chromium mineral, silicon carbide, BN, and $B_4C$ as well as any combination thereof.

Among them, the incorporation of industrial diamond powder into the appropriate working portion of the refractories can lead to the best use of the mechanical advantage of diamond such as high oxidation resistance, high hardness and high strength. Thus, the finished bricks containing industrial diamond powder are desirable to be used for the refractories for controlling flows such as the tuyere and sliding nozzle which require high oxidation and wear resistance.

The magnesia clinker to be used as a filler in the present invention may be obtained by electrofusing a raw material of magnesia such as sintered magnesia, calcined magnesia, magnesium hydroxide, and magnesium carbonate. These refractory raw materials should preferably have as high a degree of crystallinity as possible. These raw materials may also be incorporated with pitch or phenolic polymer resin powder to improve spalling resistance.

The electrofused magnesia is made into refractory bricks with the aid of a binder selected from phenolic resin, furan resin, epoxy resin, modified phenolic resin, melamine resin, and urea resin. A phenolic resin or modified phenolic resin is more desirable from the view point of residual carbon and price.

The refractory bricks may be incorporated with a powder of metal or alloy thereof such as Al, Si, Ca, Cr, Mg, and B to improve the oxidation resistance, corrosion resistance, and high temperature strength.

Magnesia clinker of the above-mentioned composition will exhibit its effect regardless of the type of refractory materials—carbon-free burned and unburned bricks, carbon-containing burned and unburned bricks, and prepared unshaped refractories.

Incidentally, the amount of carbonaceous powder to be incorporated into the refractory bricks should be from 3 wt. % to 40 wt. %. An amount below the lower limit will not be enough to produce satisfactory spalling and slag resistance. An amount in excess of the upper limit will result in difficulty in mixing, poor operation and low oxidation resistance.

DESCRIPTION OF THE PREFERRED EMBODIMENT

EXAMPLE 1

Table 1 shows the various characteristics of electrofused magnesia prepared from different raw materials. Each electrofused magnesia was prepared from ordinary sintered raw materials in different ratios and electrofused.

TABLE 1

| | Composition of raw material (wt. %) | | | | Composition of electrofused magnesia (wt. %) | | | | Ratio of single crystal in electrofused magnesia (%) |
|---|---|---|---|---|---|---|---|---|---|
| | MgO | CaO | $SiO_2$ | $B_2O_3$ | MgO | CaO | $SiO_2$ | $B_2O_3$ | |
| 1A | 99.40 | 0.55 | 0.01 | 0.005 | 99.44 | 0.50 | 0.01 | 0.004 | 79.2 |
| 1B | 99.15 | 0.71 | 0.07 | 0.035 | 99.18 | 0.67 | 0.05 | 0.032 | 71.4 |
| 1C | 99.48 | 0.27 | 0.12 | 0.006 | 99.50 | 0.24 | 0.08 | 0.006 | 32.7 |

Note:
The electrofused magnesia clinker ingots obtained from each raw material was crushed into grains and classified into a grain size of 5 to 3 mm, 3 to 1 mm, and 1 to 0 mm. Then, the ratio by weight of single crystal of the grains of 5 to 3 mm was calculated.

In the above Table 1, samples 1A and 1B are examples of the present invention, and sample C is a comparative example. It is to be noted that samples 1A and 1B pertaining to the present invention have a higher ratio of single crystal than sample 1C for the purpose of comparison.

10 mm×10 mm×60 mm of each samples cut out of the ingots of the electrofused materials shown in Table 1, in conjunction with three additional comparative examples 1D to 1F, underwent four kinds of corrosion resistance tests. The results are shown in Table 2 below.

TABLE 2

| Sample | Chemical composition (wt. %) | | | Ratio of single crystal (%) | Corrosion resistance (melt loss index)* | | | |
|---|---|---|---|---|---|---|---|---|
| | MgO | $SiO_2$ | CaO | | Test 1 | Test 2 | Test 3 | Test 4 |
| 1A | 99.44 | 0.01 | 0.50 | 79.2 | 72 | 71 | 69 | 71 |
| 1B | 99.18 | 0.05 | 0.67 | 71.4 | 76 | 73 | 74 | 73 |
| 1E | 98.52 | 0.03 | 1.38 | 36.5 | 100 | 100 | 100 | 100 |
| 1D | 99.91 | 0.02 | 0.04 | 81.1 | 95 | 92 | 90 | 92 |
| 1C | 99.50 | 0.08 | 0.24 | 32.7 | 97 | 95 | 96 | 95 |
| 1F | 99.37 | 0.22 | 0.35 | 21.3 | 108 | 105 | 105 | 110 |

*Note:
The corrosion resistance tests were performed on samples measuring 10 × 10 × 60 mm cut out of electrofused magnesia ingots.
Test 1: Dipping in molten slag having a $CaO/SiO_2$ ratio of 1.2 at 1600° C. for 15 minutes in an induction furnace.
Test 2: Dipping in molten slag having a $CaO/SiO_2$ ratio of 2.0 at 1600° C. for 15 minutes in an induction furnace.
Test 3: Dipping in molten slag having a $CaO/SiO_2$ ratio of 3.0 at 1600° C. for 15 minutes in an induction furnace.
Test 4: Dipping in molten mill scale at 1600° C. for 15 minutes in an induction furnace.

It is noted in Table 2 that samples 1A and 1B pertaining to the present invention are far superior in corrosion resistance to the comparative samples 1C to 1F. Thus the electrofused magnesia of thee present invention can be used as a filler for refractory materials of any type—shaped or unshaped, burned or unburned—to impart good corrosion resistance.

EXAMPLE 2

The chemical compositions of the electrofused magnesia clinker used in this example are shown in Table 3. Sample 2A is in accordance with the present invention, and samples 2E, 2D, 2C and 2I do not fall in the scope of the present invention.

TABLE 3

| Sample | (wt. %) | | | |
|---|---|---|---|---|
| | MgO | CaO | $SiO_2$ | $B_2O_3$ |
| 2A | 99.44 | 0.50 | 0.01 | 0.004 |
| 2E | 98.52 | 1.38 | 0.03 | 0.032 |
| 2D | 99.91 | 0.04 | 0.02 | 0.006 |
| 2C | 99.50 | 0.24 | 0.08 | 0.006 |
| 2I | 82.77 | 12.00 | 0.02 | 0.050 |

Each sample of electrofused magnesia clinker shown in Table 3 was made into unburned refractory materials according to the formulation shown in Table 4, by mixing, drying at 90° C. for 24 hours, and hardening at 250° C. for 10 hours.

In Table 4, samples 25 and 26 were further burned at 1000° C. in a reducing atmosphere.

Samples 21 and 24 contains 10 wt. % of electrofused magnesia according to the present invention. Samples 22 and 23 are examples in which mesophase carbon or diamond powder is respectively added to the formulation containing electrofused magnesia of the present invention. Samples 25 and 26 are examples of the burned products.

Refractory materials for comparison containing electrofused magnesia clinker samples 2C to 2I out of the present invention in the amount which does not fall into the scope of the present invention were prepared as shown in Table 5. These comparative examples underwent the same treatment as in the above and the properties thereof are also shown in Table 5.

Sample 26 is a comparative example in which the abovementioned unburned refractory was further burned at 1000° C. in a reducing atmosphere.

Comparative samples 21, 22, 23, 24 and 25 are unburned refractories which are inferior in corrosion resistance because they contain none or insufficient amount of the electrofused magnesia pertaining to the present invention.

Comparative sample 26, which is a burned one containing none of the electrofused magnesia Pertaining to the present invention, is inferior in corrosion resistance to sample 25 in Example which contains the electrofused magnesia as specified in the present invention.

Corrosion resistance (1) to (4) shown in Tables 4 and 5 is expressed in terms of index, with that of comparative example 1 being 100. It was determined by measuring the weight which the specimen had lost after immersion in a melting bath at 1600° C. for 15 minutes, heated by a high-frequency induction furnace. The content in the melting bath was slag ($CaO/SiO_2=1.2$) for Test 1, slag ($CaO/SiO_2=2.0$) for Test 2, slag ($CaO/SiO_2=3.0$) for Test 3, and mill scale for Test 4.

TABLE 4

| Example No. | 21* | 22* | 23* | 24* | 25** | 26** |
|---|---|---|---|---|---|---|

Composition

TABLE 4-continued

| Example No. | 21* | 22* | 23* | 24* | 25** | 26** |
|---|---|---|---|---|---|---|
| (wt. %) | | | | | | |
| Electrofused magnesia A | 50 | 50 | 10 | 86 | 50 | 10 |
| Electrofused magnesia E | 24 | | 25 | | 24 | 25 |
| Electrofused magnesia D | | | 41 | | | 42 |
| Electrofused magnesia C | | | | | | |
| Electrofused magnesia I | | 24 | | | | |
| Carbonaceous power | | | | | | |
| Natural graphite | 20 | 15 | 15 | 10 | 20 | 18 |
| Mesophase carbon | | 5 | | | | |
| Diamond power | | | | 3 | | |
| Metallic aluminum | 3 | 3 | 3 | 2 | 3 | 3 |
| Organic binder | 3 | 3 | 3 | 2 | 3 | 2 |
| Characteristic properties | | | | | | |
| Bulk density | 2.84 | 2.84 | 2.85 | 2.89 | 2.78 | 2.78 |
| Apparent porosity (%) | 3.8 | 3.7 | 3.7 | 3.6 | 1.5 | 1.8 |
| Compressive strength (kg/cm$^2$) | 421 | 430 | 441 | 461 | 320 | 380 |
| High-temperature flexural strength (kg/cm$^2$) | 128 | 131 | 139 | 140 | 130 | 140 |
| Corrosion resistance (1) index | 93 | 85 | 80 | 89 | 93 | 83 |
| Corrosion resistance (2) index | 89 | 87 | 82 | 83 | 90 | 90 |
| Corrosion resistance (3) index | 86 | 87 | 86 | 81 | 88 | 80 |
| Corrosion resistance (4) index | 93 | 95 | 93 | 89 | 90 | 88 |

*Unburned
**Burned

TABLE 5

| Example No. | 21* | 22* | 23* | 24* | 25* | 26** |
|---|---|---|---|---|---|---|
| Composition (wt. %) | | | | | | |
| Electrofused magnesia 2A | 4 | | | | | |
| Electrofused magnesia 2E | 70 | 74 | | | | |
| Electrofused magnesia 2D | | | 74 | | | 74 |
| Electrofused magnesia 2C | | | | 74 | | |
| Electrofused magnesia 2I | | | | | 74 | |
| Carbonaceous power | | | | | | |
| Natural graphite | 20 | 20 | 20 | 20 | 20 | 20 |
| Mesophase carbon | | | | | | |
| Diamond power | | | | | | |
| Metallic aluminum | 3 | 3 | 3 | 3 | 3 | 3 |
| Organic binder | 3 | 3 | 3 | 3 | 3 | 3 |

TABLE 5-continued

| Example No. | 21* | 22* | 23* | 24* | 25* | 26** |
|---|---|---|---|---|---|---|
| Characteristic properties | | | | | | |
| Bulk density | 2.82 | 2.85 | 2.97 | 2.86 | 2.84 | 2.85 |
| Apparent porosity (%) | 3.9 | 4.0 | 3.6 | 3.7 | 3.8 | 1.9 |
| Compressive strength (kg/cm$^2$) | 410 | 420 | 468 | 438 | 412 | 395 |
| High-temperature flexural strength (kg/cm$^2$) | 125 | 120 | 146 | 132 | 124 | 140 |
| Corrosion resistance (1) index | 100 | 98 | 111 | 121 | 100 | 99 |
| Corrosion resistanct (2) index | 100 | 110 | 107 | 112 | 103 | 130 |
| Corrosion resistance (3) index | 100 | 103 | 103 | 106 | 116 | 122 |
| Corrosion resistance (4) index | 100 | 99 | 108 | 136 | 127 | 102 |

*Unburned
**Burned

Tables 4 and 5 clearly indicate that the samples of the present invention are far superior to the comparative samples in the melt loss index regardless of whether they are burned or not.

EXAMPLE 3

Specimens, measuring 10 mm×10 mm×60 mm, cut out of electrofused magnesia ingots of different composition, underwent four kinds of corrosion resistance tests and a slaking test conforming to the method of Japan Society for the Promotion of Science. The results are shown in Table 6.

TABLE 6

| | Chemical composition (wt. %) | | | Corrosion resistance (melt loss index)* | | | | Slaking resistance (index) |
|---|---|---|---|---|---|---|---|---|
| Sample | MgO | CaO | SiO$_2$ | Test 1 | Test 2 | Test 3 | Test 4 | Increase in weight** |
| 3J | 99.73 | 0.21 | 0.02 | 57 | 57 | 56 | 57 | 108 |
| 3K | 99.44 | 0.45 | 0.01 | 58 | 55 | 56 | 57 | 132 |
| 3L | 98.89 | 0.90 | 0.01 | 63 | 59 | 62 | 62 | 147 |
| 3M | 98.11 | 1.71 | 0.02 | 65 | 63 | 62 | 64 | 149 |
| 3N | 99.84 | 0.11 | 0.02 | 100 | 100 | 100 | 100 | 100 |
| 3O | 99.37 | 0.31 | 0.22 | 112 | 107 | 108 | 110 | 87 |
| 3P | 98.52 | 1.38 | 0.05 | 91 | 90 | 90 | 91 | 153 |
| 3Q | 97.51 | 2.25 | 0.41 | 93 | 95 | 93 | 94 | 429 |

* Specimens, measuring 10 mm × 10 mm × 60 mm, cut out of electrofused magnesia ingots underwent corrosion resistance tests.
Test 1: Dipping in molten slag having a CaO/SiO$_2$ ratio of 1.2 at 1600° C. for 15 minutes in an induction furnace.
Test 2: Dipping in molten slag having a CaO/SiO$_2$ ratio of 2.0 at 1600° C. for 15 minutes in an induction furnace.
Test 3: Dipping in molten slag having a CaO/SiO$_2$ ratio of 3.0 at 1600° C. for 15 minutes in an induction furnace.
Test 4: Dipping in molten mill scale at 1600° C. for 15 minutes in an induction furnace.
**The slaking resistance test was performed on grains of 3.36 to 1.00 mm in size obtained by the crushing of electrofused magnesia, followed by classification. This test conforming to the method of Japan Society for the Promotion of Science consists of heating the specimen in an autoclave at 130 to 136° C. for 3 hours under 5 atms.

It is noted from Table 6 that samples 3J to 3M of the present invention are far superior to comparative samples 3N to 3Q in corrosion resistance without causing any problem in slaking resistance. These data suggest that the electrofused magnesia pertaining to the present invention can be made into refractory materials of any kind, burned or unburned, shaped or unshaped.

EXAMPLE 4

The bricks shown in Table 8 below were prepared from electrofused magnesia clinker each containing CaO and $SiO_2$ as shown in Table 7. Samples 4R and 4S accord with the present invention, and samples 4T and 4U are magnesia clinker out of the scope of the present invention.

TABLE 7

| Sample | CaO | $SiO_2$ |
|---|---|---|
| 4R | 1.38 | 0.018 |
| 4S | 0.21 | 0.018 |
| 4T | 0.31 | 0.220 |
| 4U | 2.12 | 0.018 |

TABLE 8

| Example No. | 41* | 42* | 43* | 44* | 45* | 46** | 47** |
|---|---|---|---|---|---|---|---|
| Composition (wt. %) | | | | | | | |
| Electrofused magnesia 4R | 50 | 50 | 50 | 10 | 10 | 50 | 50 |
| Electrofused magnesia 4S | 24 | 24 | 24 | | | 24 | 36 |
| Electrofused magnesia 4T | | | 2 | | | | |
| Electrofused magnesia 4U | | | | 64 | 15 | | |
| Electrofused maglime clinker | | | | | 50 | | |
| Carbonaceous power | | | | | | | |
| Natural graphite | 20 | 15 | 15 | 20 | 20 | 20 | 10 |
| Mesophase carbon | | 5 | | | | | |
| Diamond power | | | 3 | | | | |
| Metallic aluminum | 3 | 3 | 3 | 3 | 2 | 3 | 2 |
| Organic binder | 3 | 3 | 3 | 3 | 3 | 3 | 2 |
| Characteristic properties | | | | | | | |
| Bulk density | 2.87 | 2.86 | 2.86 | 2.86 | 2.85 | 2.80 | 2.81 |
| Apparent porosity (%) | 3.7 | 3.7 | 3.7 | 3.7 | 3.8 | 6.7 | 6.6 |
| Compressive strength (kg/cm$^2$) | 440 | 452 | 462 | 432 | 415 | 442 | 450 |
| High-temperature flexural strength (kg/cm$^2$) | 136 | 145 | 140 | 131 | 115 | 138 | 141 |
| Corrosion resistance (1) index | 93 | 88 | 92 | 96 | 88 | 88 | 86 |
| Corrosion resistance (2) index | 88 | 87 | 85 | 92 | 94 | 87 | 86 |
| Corrosion resistance (3) index | 84 | 82 | 83 | 87 | 109 | 84 | 87 |
| Corrosion resistance (4) index | 80 | 78 | 79 | 89 | 104 | 78 | 84 |

*Unburned
**Burned
(1) Dipping in molten slag having a $CaO/SiO_2$ ratio of 1.2 at 1600° C. for 15 minutes in an induction furnace.
(2) Dipping in molten slag having a $CaO/SiO_2$ ratio of 2.0 at 1600° C. for 15 minutes in an induction furnace.
(3) Dipping in molten slag having a $CaO/SiO_2$ ratio of 3.0 at 1600° C. for 15 minutes in an induction furnace.
(4) Dipping in molten mill scale at 1600° C. for 15 minutes in an induction furnace.8

Each formulation of Table 8 is selected from each electrofused magnesia clinker shown in Table 7, and basic refractory bricks are obtained by friction molding with the aid of an adequate amount of liquid phenolic binder, followed by drying at 90° C. for 24 hours and hardening at 250° C. for 10 hours. Samples 46 and 47 are further burned at 1000° C. in a reducing atmosphere.

Samples 41 and 44 contain more than 10 wt. % of electrofused magnesia. Samples 42 and 43 contain mesophase carbon or diamond powder, respectively.

Sample 45 contains more than 10 wt. % of electrofused magnesia in an electrofused maglime clinker material. Samples 46 and 47 are burned products.

Comparative compositions containing, as raw materials, electrofused magnesia clinker samples 4T and 4U in Table 7, out of the present invention, in the amount which does not fall into the scope of the present invention were prepared as shown in Table 9. These comparative examples underwent the same treatment as in the above and the properties thereof are also shown in Table 9. Comparative sample f in Table 9 shows an example of a burned brick.

TABLE 9

| Example No. | a* | b* | c* | d* | e* | f** |
|---|---|---|---|---|---|---|
| Composition (wt. %) | | | | | | |
| Electrofused magnesia 4R | 4 | 4 | 50 | 30 | 4 | |
| Electrofused magnesia 4S | | | 42 | 23 | | |
| Electrofused magnesia 4T | 70 | | | | 20 | |
| Electrofused magnesia 4U | | 70 | | | | 74 |
| Electrofused maglime clinker | | | | | 50 | |
| Carbonaceous power | | | | | | |
| Natural graphite | 20 | 20 | 2 | 40 | 20 | 20 |
| Mesophase carbon | | | | | | |
| Diamond power | | | | | | |
| Metallic aluminum | 3 | 3 | 3 | 3 | 2 | 3 |
| Organic binder | 3 | 3 | 2 | 4 | 3 | 3 |
| Characteristic properties | | | | | | |
| Bulk density | 2.86 | 2.87 | 3.02 | 2.79 | 2.84 | 2.80 |
| Apparent porosity (%) | 3.8 | 3.8 | 3.1 | 4.8 | 3.9 | 6.9 |
| Compressive strength (kg/cm$^2$) | 430 | 420 | 490 | 460 | 410 | 419 |
| High-temperature flexural strength (kg/cm$^2$) | 132 | 125 | 170 | 78 | 108 | 135 |
| Corrosion resistance (1) index | 100 | 99 | 131 | 140 | 92 | 97 |
| Corrosion resistant (2) index | 100 | 100 | 123 | 133 | 99 | 99 |
| Corrosion resistance (3) index | 100 | 109 | 120 | 125 | 118 | 100 |
| Corrosion | 100 | 102 | 130 | 121 | 119 | 97 |

TABLE 9-continued

| Example No. | a* | b* | c* | d* | e* | f** |
|---|---|---|---|---|---|---|
| resistance (4) index | | | | | | |

*Unburned
**Burned
Corrosion resistance:
(1) Dipping in molten slag having a CaO/SiO$_2$ ratio of 1.2 at 1600° C. for 15 minutes in an induction furnace.
(2) Dipping in molten slag having a CaO/SiO$_2$ ratio of 2.0 at 1600° C. for 15 minutes in an induction furnace.
(3) Dipping in molten slag having a CaO/SiO$_2$ ratio of 3.0 at 1600° C. for 15 minutes in an induction furnace.
(4) Dipping in molten mill scale at 1600° C. for 15 minutes in an induction furnace.

It is noted that comparative samples a, b, c, d and e provide a corrosion resistance that is inferior to the samples pertaining to the present invention because they contain non or insufficient electrofused magnesia, or because they contain carbonaceous powder in an insufficient or excessive amount.

It is noted that comparative sample f, which is a burned sample not containing the electrofused magnesia pertaining to the present invention, provides a corrosion resistance that is inferior to Sample 46 containing the electrofused magnesia as specified in the present invention.

These data suggest that the refractory materials pertaining to the present invention are superior in corrosion resistance in terms of melt loss index, whether they are burned or unburned.

EXAMPLE 5

This example demonstrates the application of electrofused magnesia to castables.

TABLE 10

| Sample | 5A | 5B | 5C* |
|---|---|---|---|
| MgO (wt. %) | 99.18 | 99.44 | 99.50 |
| CaO (wt. %) | 0.67 | 0.45 | 0.24 |
| SiO$_2$ (wt. %) | 0.05 | 0.01 | 0.08 |

*For comparison

TABLE 11

| Example | Sample 51 | Sample 52 | Comparative Sample 51 |
|---|---|---|---|
| Formulation (wt. %) | | | |
| Electrofused magnesia 5A | | | |
| 5-3 mm | 15 | | |
| 3-1 mm | 30 | | |
| 1-0 mm | 20 | | |
| Electrofused magnesia 5B | | | |
| 5-3 mm | | 15 | |
| 3-1 mm | | 30 | |
| 1-0 mm | | 20 | |
| Electrofused magnesia 5C | | | |
| 5-3 mm | | | 15 |
| 3-1 mm | | | 30 |
| 1-0 mm | | | 20 |
| Sintered magnesia fine powder | 30 | 30 | 30 |
| Alumina cement | 3 | 3 | 3 |
| Silica flour | 2 | 2 | 2 |
| Dispersing agent | +0.1 | +0.1 | +0.1 |
| Physical properties | | | |
| Bulk density (%) | | | |
| 110° C. × 24 h | 3.03 | 3.04 | 3.01 |
| 1500° C. × 3 h | 3.02 | 3.01 | 3.01 |
| Apparent porosity (%) | | | |
| 110° C. × 24 h | 16.0 | 15.8 | 16.4 |
| 1500° C. × 3 h | 18.1 | 18.3 | 17.9 |
| Flexural strength (kg/cm$^2$) | | | |
| 110° C. × 24 h | 38 | 36 | 41 |
| 1500° C. × 3 h | 75 | 69 | 83 |
| Linear change ratio (%) | | | |
| 1500° C. × 3 h | −0.42 | −0.35 | −0.55 |
| Corrosion resistance * Melt loss index. | 89 | 83 | 100 |

* Evaluated by measuring corrosion by slag (CaO/SiO$_2$ = 3.0) on the lining of a high-frequency induction furnace at 1650° C. for 5 hours.

Castable refractories in Table 11 are obtained by mixing and molding the electrofused magnesia having chemical compositions as specified in Table 10. Each sample contains 5.6% of a casting ingredient. It is noted that samples 51 and 52 pertaining to the present invention are superior in corrosion resistance.

EXAMPLE 6

This example demonstrates the application of electrofused magnesia to refractory ramming materials.

Samples shown in Table 12 were prepared by formulating the samples of Table 10.

TABLE 12

| Example | Sample 61 | Sample 62 | Comparative Sample 61 |
|---|---|---|---|
| Formulation (wt. %) | | | |
| Electrofused magnesia 5A | | | |
| 5-3 mm | 15 | | |
| 3-1 mm | 30 | | |
| 1-0 mm | 24 | | |
| Electrofused magnesia 5B | | | |
| 5-3 mm | | 15 | |
| 3-1 mm | | 30 | |
| 1-0 mm | | 24 | |
| Electrofused magnesia 5C | | | |
| 5-3 mm | | | 15 |
| 3-1 mm | | | 30 |
| 1-0 mm | | | 24 |
| Sintered magnesia fine powder | 28 | 28 | 28 |
| Bittern (32 Bé) | +5 | +5 | +5 |
| Silica flour | 3 | 3 | 3 |
| Borax | +0.5 | +0.5 | +0.5 |
| Physical properties | | | |
| Bulk density (%) | | | |
| 110° C. × 24 h | 2.98 | 2.99 | 2.96 |
| 1500° C. × 3 h | 2.93 | 2.93 | 2.89 |
| Apparent porosity (%) | | | |
| 110° C. × 24 h | 14.3 | 14.0 | 14.8 |
| 1500° C. × 3 h | 20.0 | 19.8 | 20.1 |
| Flexural strength (kg/cm$^2$) | | | |
| 110° C. × 24 h | 81 | 71 | 86 |
| 1500° C. × 3 h | 103 | 92 | 109 |
| Linear change ratio (%) | | | |
| 1500° C. × 3 h | −0.16 | −0.13 | −0.20 |
| Corrosion resistance * Melt loss index. | 84 | 77 | 100 |

* Evaluated by rotating corrosion test with electromagnetic steel scale at 1450° C. for 30 minutes 10 cycles.

Further, the samples of electrofused magnesia shown in Table 12 were mixed by a sand mill into refractory ramming materials for a heating furnace. The sample for quality evaluation was molded under a pressure of 400 kg/cm$^2$. It is noted from Table 12 that samples 61 and 62 pertaining to the present invention are superior in resistance to corrosion by electromagnetic steel slag.

INDUSTRIAL FEASIBILITY (1) The electrofused magnesia of the present invention can be obtained from a magnesia raw material of comparatively low purity. It has a high ratio of single crystal as well as a high CaO/SiO$_2$ ratio. CaO concentrated on the grain boundary reacts with slag to raise the slag viscosity, thereby preventing the infiltration of slag into the grain boundary. Because of this property, the electrofused magnesia can be used as a filler for refractory bricks to provide good corrosion resistance.

(2) The electrofused magnesia according to the present invention used as a filler improves refractory materials in terms of strength, toughness, and elastic modulus at high temperatures.

(3) The electrofused magnesia can be produced more economically with less electric power than the conventional product if the magnesia raw material is of the same purity.

(4) The electrofused magnesia gives rise to a filler composed of single crystal grains. It contains a trace amount of $CaO\text{-}SiO_2$ in the form of a solid solution, which, during the use of the refractory bricks, separates out to wet the surface of the grains, covering the grains with a highly viscous film on account of the high $CaO/SiO_2$ ratio. This produces the following two effects.

(a) The film of the high $CaO/SiO_2$ ratio itself functions as a sintering agent between the grains of the basic filler. In the case of unburned bricks, this promotes sintering of the grains of the basic filler at the temperature of using, imparting to them high strength and high corrosion resistance.

(b) In the case of carbon-containing basic bricks, the highly viscous film of the high $CaO/SiO_2$ ratio presents in the filler, which covers carbon fine particles, effectively protecting the carbonaceous powder from oxidation.

(5) For reasons mentioned above, the electrofused magnesia will find use as lining bricks, burned or unburned, for high temperature refining furnaces such as converters of high secondary combustion ratio and stainless steel melting furnaces.

(6) Owing to its high ratio of single crystal, the electrofused magnesia will find use as inexpensive optical windows, electronic device substrates, and crucibles of magnesia single crystal, in addition to ordinary refractory materials.

We claim:

1. An electrofused magnesia clinker for a refractory material consisting essentially of 98.0 to 99.8 wt. % of MgO, less than 0.05 wt. % of $SiO_2$, and 0.1 to 2.0 wt. % of CaO.

2. A refractory material comprising electrofused magnesia clinker consisting essentially of 98.0 to 99.8 wt. % of MgO, less than 0.05 wt. % of $SiO_2$, and 0.1 to 2.0 wt. % of CaO.

3. A refractory material comprising electrofused magnesia clinker and 3–40 wt. % of a carbonaceous material, said electrofused magnesia clinker consisting essentially of 98.0 to 99.8 wt. % of MgO, less than 0.05 wt. % of $SiO_2$, and 0.1 to 2.0 wt. % of CaO.

4. A refractory material as defined in claim 3 which contains more than 10 wt. % of electrofused magnesia clinker.

5. The refractory material of claim 2 or 3 which is unburned bricks, burned bricks, and prepared unshaped refractories.

6. An electrofused magnesia clinker for a refractory material said clinker consisting of crystal containing 98.0 to 99.8 wt. % of MgO, less than 0.05 wt. % of $SiO_2$, and 0.2 to 1.0 wt. % of CaO.

7. An electrofused magnesia clinker for a refractory material said clinker consisting of crystal containing 98.0 to 99.8 wt. % of MgO, less than 0.05 wt. % of $SiO_2$, and 0.2 to 2.0 wt. % of CaO.

8. An electrofused magnesia clinker for a refractory material said clinker consisting of crystal containing 98.0 to 99.8 wt. % of MgO, less than 0.02 wt. % of $SiO_2$, and 0.2 to 2.0 wt. % of CaO, in which low-silica periclase crystals have lime which separates on their grain boundary.

9. A refractory material comprising electrofused magnesia clinker consisting of crystals containing 98.0 to 99.8 wt. % of MgO, less than 0.05 wt. % of $SiO_2$, and 0.2 to 2.0 wt. % of CaO.

10. A refractory material comprising more than 10 wt. % of electrofused magnesia clinker consisting of crystals containing 98.0 to 99.8 wt. % of MgO, less than 0.05 wt. % of $SiO_2$, and 0.2 to 1.0 wt. % of CaO.

11. A refractory material comprising more than 10 wt. % of magnesia clinker consisting of crystals containing 98.0 to 99.8 wt. % of MgO, less than 0.03 wt. % of $SiO_2$, and 0.1 to 1.0 wt. % of CaO.

12. A refractory material comprising more than 10 wt. % of electrofused magnesia clinker consisting of crystals containing 98.0 to 99.8 wt. % of MgO, less than 0.02 wt. % of $SiO_2$, and 0.2 to 2.0 wt. % of CaO, in which low-silica periclase crystals have lime which separates on their grain boundary.

13. A refractory material comprising more than 10 wt. % of electrofused magnesia clinker and 3–40 wt. % of a carbonaceous material, said electrofused magnesia clinker containing 98.0 to 99.8 wt. % of MgO, less than 0.02 wt. % of $SiO_2$, and 0.2 to 2.0 wt. % of CaO in which low-silica periclase crystals have lime which separates on their grain boundary.

14. A refractory material as in any of claims 9 to 13 which is selected from a group consisting of unburned bricks, burned bricks and prepared unshaped refractory material.

* * * * *